US008312710B2

(12) United States Patent
Surnilla et al.

(10) Patent No.: US 8,312,710 B2
(45) Date of Patent: Nov. 20, 2012

(54) COLD-START RELIABILITY AND REDUCING HYDROCARBON EMISSIONS IN A GASOLINE DIRECT INJECTION ENGINE

(75) Inventors: Gopichandra Surnilla, West Bloomfield, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 873 days.

(21) Appl. No.: 12/351,715

(22) Filed: Jan. 9, 2009

(65) Prior Publication Data

US 2010/0179743 A1 Jul. 15, 2010

(51) Int. Cl.

| | |
|---|---|
| ***F01N 3/00*** | (2006.01) |
| ***F02D 41/06*** | (2006.01) |
| ***F02M 1/00*** | (2006.01) |
| ***F02P 15/00*** | (2006.01) |
| ***F02P 19/02*** | (2006.01) |
| ***G06F 19/00*** | (2011.01) |
| ***G06G 7/70*** | (2006.01) |

(52) U.S. Cl. .................... 60/285; 123/179.5; 123/179.6; 123/179.18; 701/113

(58) Field of Classification Search .................... 60/285; 701/103, 113; 123/179.5, 179.6, 179.18, 123/491

See application file for complete search history.

(56) References Cited

U.S. PATENT DOCUMENTS

| | | | | |
|---|---|---|---|---|
| 5,357,790 | A | 10/1994 | Hosoya | |
| 5,676,101 | A * | 10/1997 | Kawai et al. | 123/179.18 |
| 5,870,986 | A | 2/1999 | Ichinose | |
| 6,234,141 | B1 * | 5/2001 | Kerns et al. | 123/305 |
| 6,321,530 | B1 * | 11/2001 | Hoshi et al. | 60/274 |
| 6,338,331 | B1 * | 1/2002 | Watanabe et al. | 123/399 |
| 6,658,346 | B2 | 12/2003 | Maegawa | |
| 6,675,768 | B2 | 1/2004 | Kanai | |
| 6,786,201 | B2 | 9/2004 | Ohtani | |
| 6,823,849 | B2 | 11/2004 | Ichinose et al. | |
| 6,851,302 | B2 | 2/2005 | Hashiguchi | |
| 6,913,000 | B2 | 7/2005 | Hasegawa et al. | |
| 7,159,566 | B2 | 1/2007 | Tomita et al. | |
| 7,171,953 | B2 | 2/2007 | Altenschmidt | |
| 7,406,942 | B2 | 8/2008 | Ashizawa et al. | |
| 7,478,625 | B1 * | 1/2009 | Gwidt et al. | 123/481 |
| 2003/0172900 | A1 * | 9/2003 | Boyer et al. | 123/198 F |
| 2004/0123587 | A1 * | 7/2004 | Kamiya et al. | 60/284 |
| 2006/0060162 | A1 * | 3/2006 | Fukui et al. | 123/179.16 |
| 2006/0249120 | A1 | 11/2006 | Semii et al. | |
| 2007/0056565 | A1 * | 3/2007 | Fuwa et al. | 123/481 |
| 2007/0093948 | A1 | 4/2007 | Sago | |
| 2007/0107417 | A1 * | 5/2007 | Surnilla et al. | 60/285 |
| 2008/0228377 | A1 * | 9/2008 | Hosokawa et al. | 701/103 |
| 2010/0175657 | A1 | 7/2010 | Pursifull et al. | |

* cited by examiner

*Primary Examiner* — Thomas Denion
*Assistant Examiner* — Audrey K Bradley
(74) *Attorney, Agent, or Firm* — Julia Voutyras; Alleman Hall McCoy Russell & Tuttle LLP

(57) ABSTRACT

A method for starting an engine of a motor vehicle, the engine having an intake manifold, an intake throttle controlling admission of air into the intake manifold, and a plurality of combustion chambers communicating with the intake manifold, the method comprising providing a reduced pressure of air in the intake manifold prior to delivering fuel or spark to the engine, the reduced pressure of air responsive to a temperature of the engine; delivering fuel to one or more of the plurality of combustion chambers in an amount based on the reduced pressure of air; and delivering spark to the one or more combustion chambers to start the engine.

17 Claims, 6 Drawing Sheets

COLD-START RELIABILITY AND REDUCING HYDROCARBON EMISSIONS IN A GASOLINE DIRECT INJECTION ENGINE

TECHNICAL FIELD

The present application relates to the field of motor-vehicle engine systems and more particularly to cold-start reliability and emissions control in motor-vehicle engine systems.

BACKGROUND AND SUMMARY

Reliable air/fuel ignition in a liquid-fueled, direct-injection (DI) engine depends on adequate vaporization of fuel in the engine's combustion chambers. At cold start, however, and especially when the engine temperature is low, adequate vaporization of the fuel may be difficult to achieve. Further, the temperatures where vaporization becomes an issue may increase with decreasing volatility of the fuel (e.g., regular gasoline, premium gasoline, summer gasoline, alcohol-based fuels, diesel fuel, in order of decreasing volatility). To compensate for inadequate vaporization of liquid fuels at low engine temperatures, a fuel-injection control unit may be configured to adjust the rate of fuel-injection in response to engine temperature, and to fuel the engine's combustion chambers at an increased initial rate when the engine temperature is low. Effectively, the stratagem is to flood the intake port or combustion chamber with liquid fuel, expecting only a portion of the liquid fuel to evaporate. However, various disadvantages are associated with overfueling a DI engine during cold start conditions.

A first problem relates to torque control during the run-up period, viz., the period after the engine starts but before a stable idle is achieved. If, as a result of cold-start overfueling, a significant amount of unvaporized fuel accumulates in the combustion chambers of an engine, an unwanted surge of torque may occur during run-up, when the fuel finally vaporizes and is combusted. Some engine systems are configured to intentionally run up the engine speed to clear out excess fuel left over from the start up, but this strategy is inelegant and degrades fuel economy.

A second problem relates to emissions-control performance. During cold start, a DI engine system may emit the same quantity of hydrocarbon as it does over several hours of sustained operation. Excessive hydrocarbon emissions may result from exhaust-system catalysts being underheated, from deliberate enrichment of the pre-ignition air/fuel mixture to enhance ignition reliability (as discussed above) and from unreliable ignition, i.e., misfire, occurring during the first few expansion strokes. If misfire occur at this time, multiple and/or extended cranking attempts may be necessary to start the engine, further worsening emissions-control performance.

A third problem relates to the ability of the engine's high-pressure pump to provide the necessary initial rate of fueling to all of the combustion chambers of the engine. Depending on conditions, initial injection rates required for cold starting may be great enough to overwhelm the capacity of (i.e., to outstrip) the high-pressure pump, especially if the pump is engine-driven and has a relatively small capacity—as in a gasoline direct-injection (GDI) engine, for example.

To address at least some of these and other problems associated with cold-start overfueling in DI engine systems, various countermeasures have been devised. A countermeasure directed to the fuel-delivery problem in GDI engines has been to pump up the fuel rail while the engine is cranking, but to deliver no fuel to the combustion chambers until the fuel rail is fully pressurized. Once the fuel rail is fully pressurized, the injection sequence begins and ignition is attempted. This countermeasure may suffer from a number of drawbacks, however. First, cranking periods are necessarily extended because ignition is delayed until the fuel rail is fully pressurized. Second, the rapid decrease in fuel-rail pressure when the fuel is finally delivered may cause injection-mass control difficulties, resulting in difficult or failed starting. Third, the accumulated fuel-rail pressure may be exhausted before the first firing occurs, should firing occur at all. As a result, multiple and/or extended cranking attempts may be necessary to start the engine.

A countermeasure directed to the torque-control problem described above is to leave some combustion chambers unfueled during cold start at low engine temperatures. In this manner, the accumulation of unvaporized fuel in the combustion chambers of the engine is reduced, thereby limiting the surge of torque that may occur during run-up, when the accumulated fuel vaporizes and is combusted. This strategy may also help to limit overheating of exhaust-stream catalysts during the run-up, which could occur if an excessive amount of uncombusted fuel were to enter the exhaust stream. A potential disadvantage of this countermeasure is that some combustion chambers in an engine may be prone to misfire due to degradation of one or more components—fuel injectors, valve seals, spark plugs, for example. If a combustion chamber prone to misfire is among those included for fueling in a starting sequence in which only a limited number of combustion chambers are fueled, the engine may not develop adequate torque to start. Thus, a potentially useful additional countermeasure that might otherwise be modified to address the fuel-delivery and emissions-control problems described above is compromised by misfire during cranking.

To address the connection between misfire and hydrocarbon emissions, various approaches to detect misfire in a combustion chamber have been disclosed. For example, misfire may be detected based on the angular velocity of a crankshaft measured at selected crank angles, as described in U.S. Pat. Nos. 5,357,790 and 6,658,346. Misfire detection has been used in a number of ways to improve engine performance; U.S. Pat. No. 5,870,986, for example, describes a system in which fuel injection timing is adjusted based on whether a misfire in a combustion chamber is detected. However, none of the approaches cited above address the effect on emissions-control performance of misfire in the first fueled combustion chamber during start-up.

The inventors herein have recognized the issues discussed above and have provided a series of approaches to address at least some of them. Therefore, in one embodiment, a method for starting an engine of a motor vehicle under varying temperature conditions is provided, the engine having a plurality of combustion chambers and a pump for pressurizing fuel for delivery to the combustion chambers. The method comprises, during a first, higher-temperature, starting condition, directly injecting fuel into all of the combustion chambers during at least an initial fueled cycle of the engine, and spark igniting the fuel to increase the rotation speed of the engine. In this context, the initial fueled cycle comprises two rotations of a crankshaft of the engine during which at least some fuel is injected for a first time since the engine was brought from rest. The method further comprises, during a second, lower-temperature, starting condition, directly injecting fuel into less than all of the combustion chambers during at least the initial fueled cycle of the engine, and spark igniting the fuel to increase a rotation speed of the engine. This action may prevent the engine's high-pressure pump from being outstripped during cold-start conditions at low engine temperatures. Also, it may allow subsequently fueled cylinders to start at a higher engine speed and lower manifold air pressure than otherwise possible, thereby further reducing the need for overfueling.

In another embodiment, a method for starting an engine of a motor vehicle is provided, the engine having an intake manifold, an intake throttle controlling admission of air into the intake manifold, and a plurality of combustion chambers communicating with the intake manifold. This method comprises providing a reduced pressure of air in the intake manifold prior to delivering fuel or spark to the engine, the reduced pressure of air responsive to a temperature of the engine. The method further comprises delivering fuel to one or more of the plurality of combustion chambers in an amount based on the reduced pressure of air, and delivering spark to the one or more combustion chambers to start the engine. Other embodiments disclosed herein provide more particular methods, and engine-system configurations in which the various methods may be enacted. In this manner, a GDI engine system may achieve a more reliable cold start at low engine temperatures and with little or no added hardware cost. Further, the cranking time for low-temperature starting may be reduced by not having to build up excessive fuel pressure prior to ignition. And finally, hydrocarbon emissions during low-temperature starts may be reduced by fueling a reduced number of combustion chambers, whilst passing over those combustion chambers that are prone to misfire.

Injecting fuel into low pressure air may result in markedly faster evaporation of liquid fuel than injecting into atmospheric or higher pressure air. Further, by controlling the absolute manifold air pressure, one can make every start occur under more similar conditions regardless of elevation or barometric pressure. Providing consistency over a wide range of cold-start conditions may further reduce the engineering and testing required to find a workable fueling formula and/or protocol.

In short, starting on less than all cylinders reduces the overall need for overfueling during cold start at low engine temperatures. Reduced or controlled manifold air pressure starts have a double effect of reducing the fueling requirement while increasing the fraction of fuel evaporated. Enacted separately or together, both of these actions may have further advantageous effects.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

Figure 1:
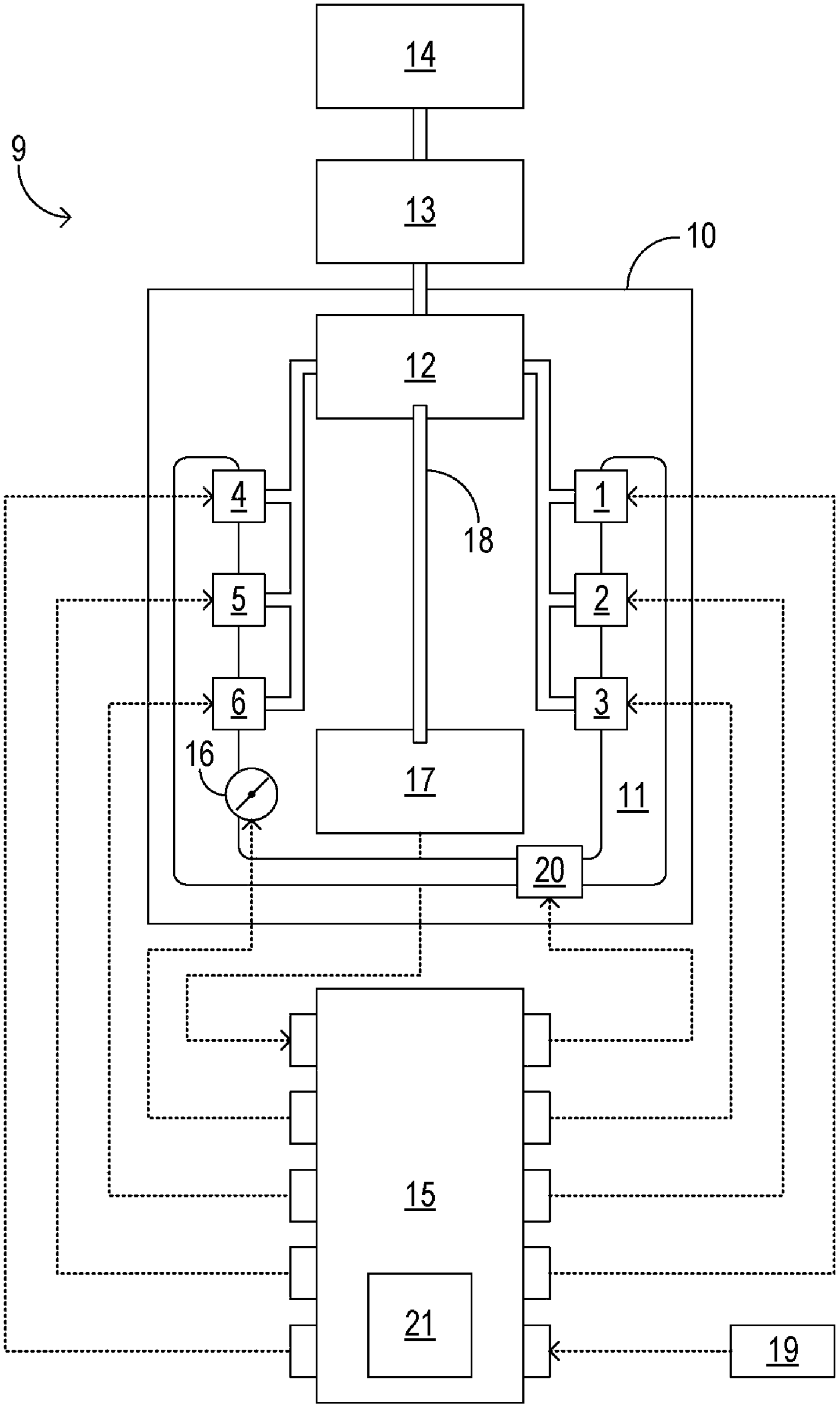
FIG. 1 schematically shows an example engine system in accordance with the present disclosure.

FIG. 1 shows example engine system 9 in schematic detail. The engine system includes GDI engine 10. In the illustrated embodiment, the engine comprises six combustion chambers arranged in a V-6 configuration. The combustion chambers are provided intake air via intake manifold 11 and are provided fuel via fuel injectors 1-6, which are directly coupled to the combustion chambers. In other embodiments equally consistent with this disclosure, the engine may have a different configuration and/or a different number of combustion chambers and fuel injectors.

Continuing in FIG. 1, each of the fuel injectors 1-6 is provided pressurized fuel via high-pressure pump 12, which may be an engine-driven pump. In the illustrated embodiment, the high-pressure pump is mechanically coupled to engine 10. The high pressure pump is supplied fuel by lift pump 13, which draws fuel from fuel tank 14. Further, each of the fuel injectors is operatively coupled to, and configured to receive a control signal from controller 15. Controller 15 may be any electronic control unit of engine system 9 or of the motor vehicle in which the engine system is disposed. Controller 15 also supplies a control signal to intake throttle 16. The intake throttle may be fluidically coupled to an air cleaner or turbocharger of the engine system (not shown in FIG. 1) and configured to regulate a flow of intake air into engine 10. In addition to providing control signals to the intake throttle, the fuel injectors, and various other controllable engine elements, the controller may be operatively coupled to various engine and/or motor-vehicle sensors.

In the illustrated embodiment, the controller is configured to receive an output (e.g., a voltage output) from crank-angle sensor 17. The output of crank-angle sensor 17 is responsive to a rotation angle of a crankshaft 18 disposed in engine 10. The crank-angle sensor may report the crank angle with such accuracy as to enable controller 15 to estimate an instantaneous and/or interval-averaged rotation speed of the crankshaft at various crank angle positions. Using this data, the controller may be configured to determine if a misfire in any combustion chamber of the engine has occurred, and further, to determine which of the engine's combustion chambers has misfired. The controller is further configured to receive an output from engine temperature sensor 19, and from manifold air pressure sensor 20. The manifold air pressure sensor is responsive to an air pressure in intake manifold 11.

In the illustrated embodiment, controller 15 includes memory module 21. The memory module may be configured to store data relating to any set-up, state, or condition of the motor vehicle. In particular, the memory module may be configured to accumulate and store a start-up misfire record for each of the engine's combustion chambers.

Figure 2:
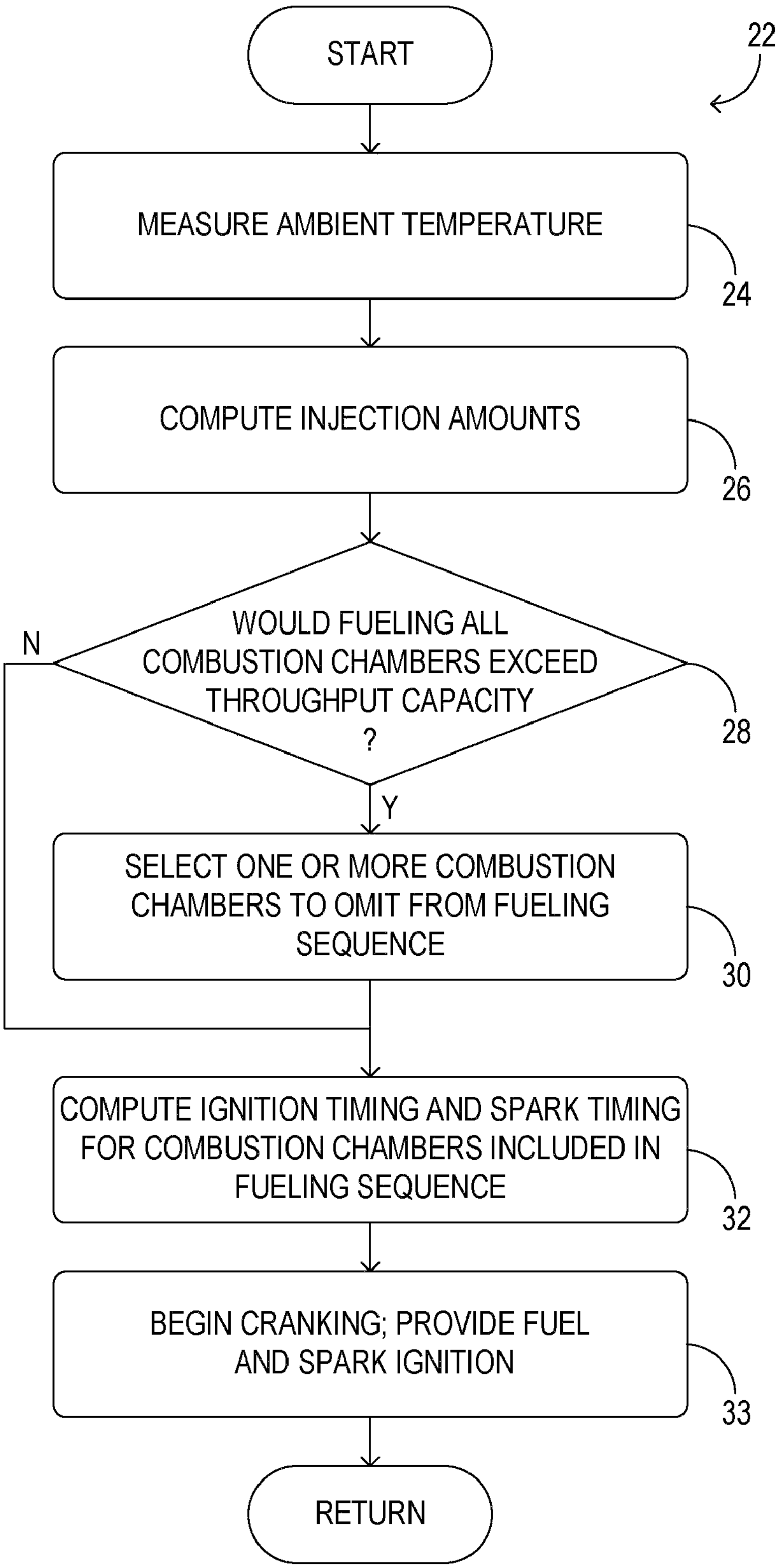
FIG. 2 shows an example method for starting an engine, in accordance with the present disclosure.

FIG. 2 illustrates an example method 22 for providing fuel to an engine of a motor vehicle during start-up under varying temperature conditions, the engine having a plurality of combustion chambers and a pump for pressurizing fuel for delivery to the combustion chambers. The method comprises, during a first, higher-temperature, starting condition, directly injecting fuel into all of the combustion chambers during at least an initial fueled cycle of the engine, and spark igniting the fuel to increase the rotation speed of the engine, the initial fueled cycle comprising two rotations of a crankshaft of the engine during which at least some fuel is injected for a first time since the engine was brought from rest. The method further comprises, during a second, lower-temperature, starting condition, directly injecting fuel into less than all of the combustion chambers during at least the initial fueled cycle of the engine, and spark igniting the fuel to increase a rotation speed of the engine. In some embodiments, the method may be executed any time an engine start is requested. In other embodiments, the method may be executed when an engine start is requested only after the engine has been off for a predetermined period of time. Though described presently with continued reference to aspects of FIG. 1, the example method may be enacted by various other configurations as well.

Method 22 begins at 24, where an engine temperature is measured. The engine temperature may be measured or estimated by an electronic control unit such as controller 15 via a sensor such as engine temperature sensor 19. For this purpose, however, virtually any motor-vehicle component responsive to engine temperature and operatively coupled to the controller may be used to measure the temperature.

Method 22 then advances to 26, where the electronic control unit computes the fuel-injection amounts required at start up for each combustion chamber of the engine. The fuel-injection amounts computed at 26 may be such as to provide a stoichiometric or near-stoichiometric air-to-fuel ratio in some or all of the combustion chambers of the engine. The computations enacted by the electronic control unit may be based at least partly on the volatility of the fuel and on the engine temperature measured at 24. For instance, during relatively warm cold starts and using relatively volatile fuel, the computed fuel-injection amounts may be relatively low. Under such conditions, where liquid fuel injected into the combustion chambers of the engine is efficiently vaporized, relatively little overfueling may be needed to provide reliable ignition and adequate starting torque. However, at lower engine temperatures and/or with a less volatile fuel, the computed fuel injection amounts may be higher. For example, alcohol-based fuels are less volatile than gasoline (in addition to requiring more fuel for a given air mass for stoichiometric combustion). Therefore, alcohol-based fuels and alcohol blends may require undesirably large fuel injection rates for cold start at low engine temperatures. The electronic control unit may compute the fuel injection amounts based on engine temperature and fuel composition using any appropriate digital and/or analog electronics-algorithms, look-up tables, analog computation, etc.

In some embodiments, method 22 may be enacted in an engine system configured to regulate the intake-manifold air pressure. Examples of such engine systems include turbocharged and supercharged engine systems as well as engine systems configured to operate at reduced intake-manifold air pressure at least under some the conditions. For such engine systems, the computations enacted at 26 may be based at least partly on a target intake-manifold air pressure, and may provide a stoichiometric or near-stoichiometric air-to-fuel ratio in some or all of the combustion chambers of the engine.

Method 22 then advances to 28, where the electronic control unit determines whether fueling all of the engine's combustion chambers in a single cycle of the engine would exceed the throughput capacity of the engine's high-pressure pump (e.g. high-pressure pump 12 in FIG. 1). In one embodiment, the determination may be based on the total, combined fuel-injection amounts computed for all of the engine's combustion chambers, and on an average throughput capacity of the high-pressure pump integrated over one cycle of the engine.

In another embodiment, the determination may be based on whether providing fuel injection to all of the engine's combustion chambers in the computed amounts would exceed the throughput capacity of the engine's high-pressure pump at any point in the fueling sequence. To illustrate process step 28 in this embodiment, FIG. 3 is provided.

Figure 3:
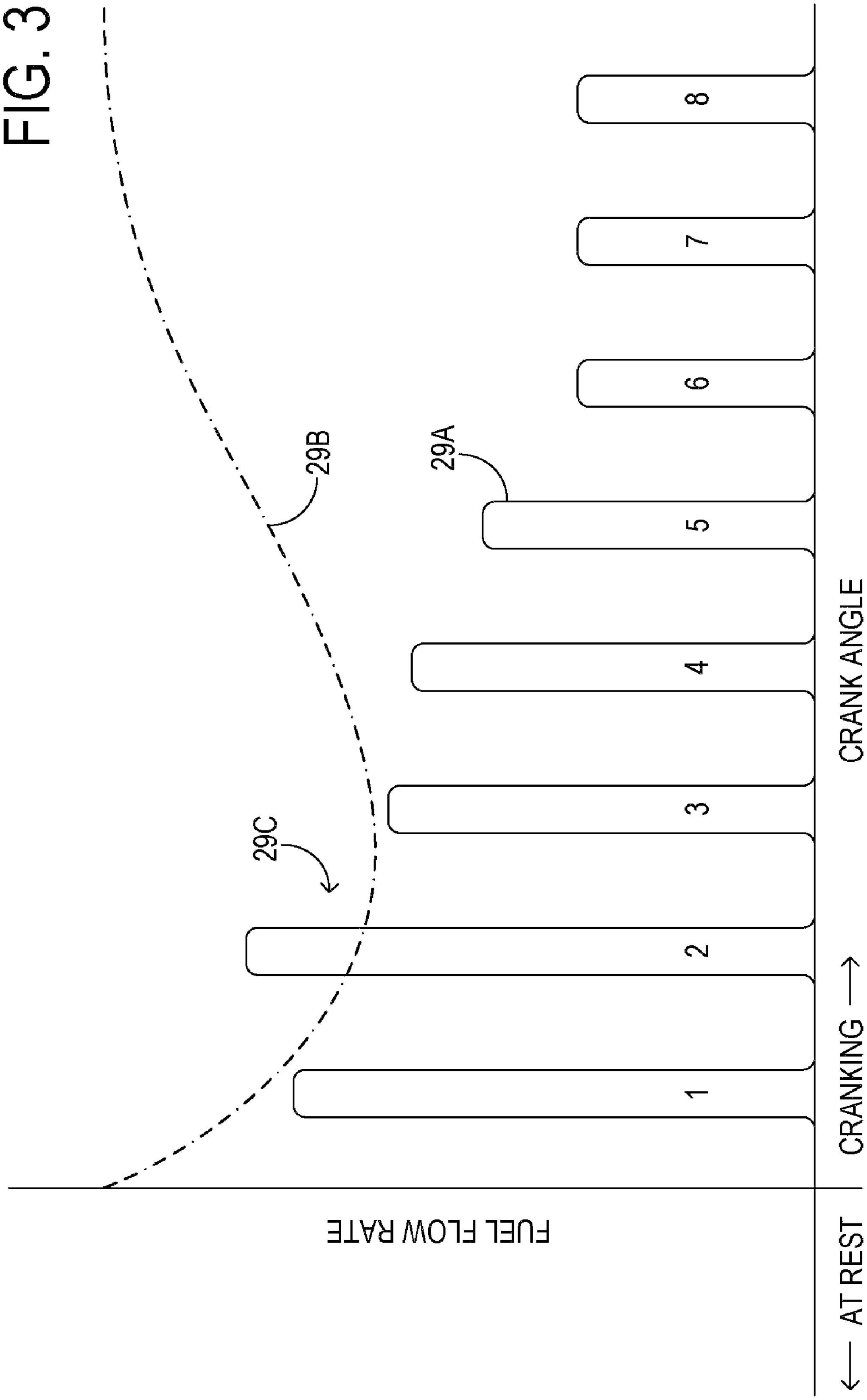
FIG. 3 shows a hypothetical graph of fuel injection rate and high-pressure pump throughput capacity versus crank angle, in accordance with the present disclosure.

FIG. 3 shows a hypothetical graph 29A of fuel-injection flow rate versus crank angle for a series of consecutive fuel-injection events during a cold start of an engine. It will be understood that the series of fuel-injection events may be spaced unevenly with respect to time, as the engine speed will increase during the cranking period and subsequent run up. In addition, the fuel-injection amounts (i.e., the appropriately scaled areas under 29A for each of the fuel injection events) may decrease with injection number, because each successful combustion increases the temperature of the engine and therefore the vapor pressure of the fuel. As the vapor pressure of the fuel increases, less liquid fuel need be injected to provide reliable ignition and torque, inasmuch as the fuel's vapor pressure at the temperature of the engine is a surrogate measure of a fuel's propensity to evaporate.

The graph also shows, at 29B, a curve representing a throughput capacity of the engine's high-pressure pump. The curve may have multiple slopes and inflections, with some factors increasing throughput capacity with crank angle and other factors decreasing it. For example, the injection of fuel at the early stages of the cold-start may decrease the slope of the curve by depressurizing elements on the high-pressure side of the pump. Other factors, such as engine speed increasing with crank angle may tend to increase the slope of the curve. The combined effects of increasing engine speed and increasing temperature make it unlikely that the high-pressure pump will be outstripped after the first few successful combustion events.

Under favorable conditions of high-enough engine temperature, high-enough fuel volatility, and freedom from misfire, it is possible that the computed fuel-injection flow rate 29A will not exceed throughput capacity curve 29B at any time during the cold start. In that event, process step 28 of method 22 (FIG. 2) would evaluate negative, and the method would advance to 32. However, for purposes of illustration, the graph of FIG. 3 shows, at 29C, a point where a computed fuel-injection rate, if delivered, would exceed the throughput capacity of the high-pressure pump. In that event, process step 28 will evaluate positive, and the method will advance to 30. This condition is referred to herein as a first starting condition; during the first starting condition, fuel may be supplied to the engine via direct injection into each of the engine's combustion chambers, according to a first fueling sequence.

Returning now to FIG. 2, if fueling all of the engine's combustion chambers in a single cycle of the engine would exceed the throughput capacity of the engine's high-pressure pump, then method 22 advances to 30, where one or more of the engine's combustion chambers are selected for omission from the fueling sequence. This condition is referred to herein as a second starting condition; during the second starting condition, fuel may be supplied to the engine via direct injection into less than all of the engine's combustion chambers, according to a second fueling sequence. The manner in which one or more combustion chambers are selected for omission from the first fueling sequence may vary depending on the engine-system configuration in which method 22 is enacted. In one embodiment, the fueling of every third combustion chamber in the first fueling sequence may be omitted. For example, if the first fueling sequence comprises fueling combustion chambers in the order 1, 3, 4, 2, 5, 6, 1, etc., then the second fueling sequence (i.e., the sequence provided at 30) may comprise fueling the combustion chambers in the order 1, 3, PASS, 2, 5, PASS, 1, etc. Other embodiments may omit fueling every other combustion chamber, every third or fourth combustion chamber, etc. Further, in some embodiments, a variable number of combustion chambers may be left unfueled, that number depending on conditions such as temperature and being the minimum number to avoid outstripping the high-pressure pump. In yet another series of embodiments, the one or more fuel injections omitted from the second fueling sequence based on a frequency of start-up misfire in the plurality of combustion chambers. The one or more fuel injections omitted from the second fueling sequence may include, for example, a fuel injection into a most frequently misfiring combustion chamber of the plurality of combustion chambers, as illustrated in FIG. 3 and described hereinafter.

Continuing in FIG. 2, method 22 advances from 30 to 32, where injection and spark timing of the combustion chambers included in the (first or second) fueling sequence are scheduled. The scheduling of injection and spark timing may be based at least partly on which, if any, of the combustion chambers were omitted from the fueling sequence.

Method 22 then advances to 33, where engine cranking begins, and where fuel-injection and spark-ignition events scheduled in the previous step are delivered to the combustion chambers of the engine. In some embodiments, an intake of the engine may be throttled prior to the first fueled cycle of the engine. Further, the degree of throttling may be responsive to the temperature. To provide the throttling, an electronic control unit of the engine system may command an intake throttle (e.g. intake throttle 16 of FIG. 1) to close at least partly. In one embodiment, more throttling may be provided at lower temperatures, and less throttling may be provided at higher temperatures. In another embodiment, the engine intake may be throttled during the first starting condition or the second starting condition prior to the initial fueled cycle, the degree of throttling during the second starting condition adjusted in response to a number of combustion chambers not fueled in the initial fueled cycle, and the degree of throttling during the first starting condition adjusted in response to the temperature. After 33, method 22 returns.

Method 22 may be repeated as necessary to effect starting. However, it is contemplated that the total injection requirement may decrease after the first successful firing event, such that the electronic control unit may be configured to commence fueling all combustion chambers before the second ‘pop’ of any combustion chamber in the fueling sequence.

Figure 4:
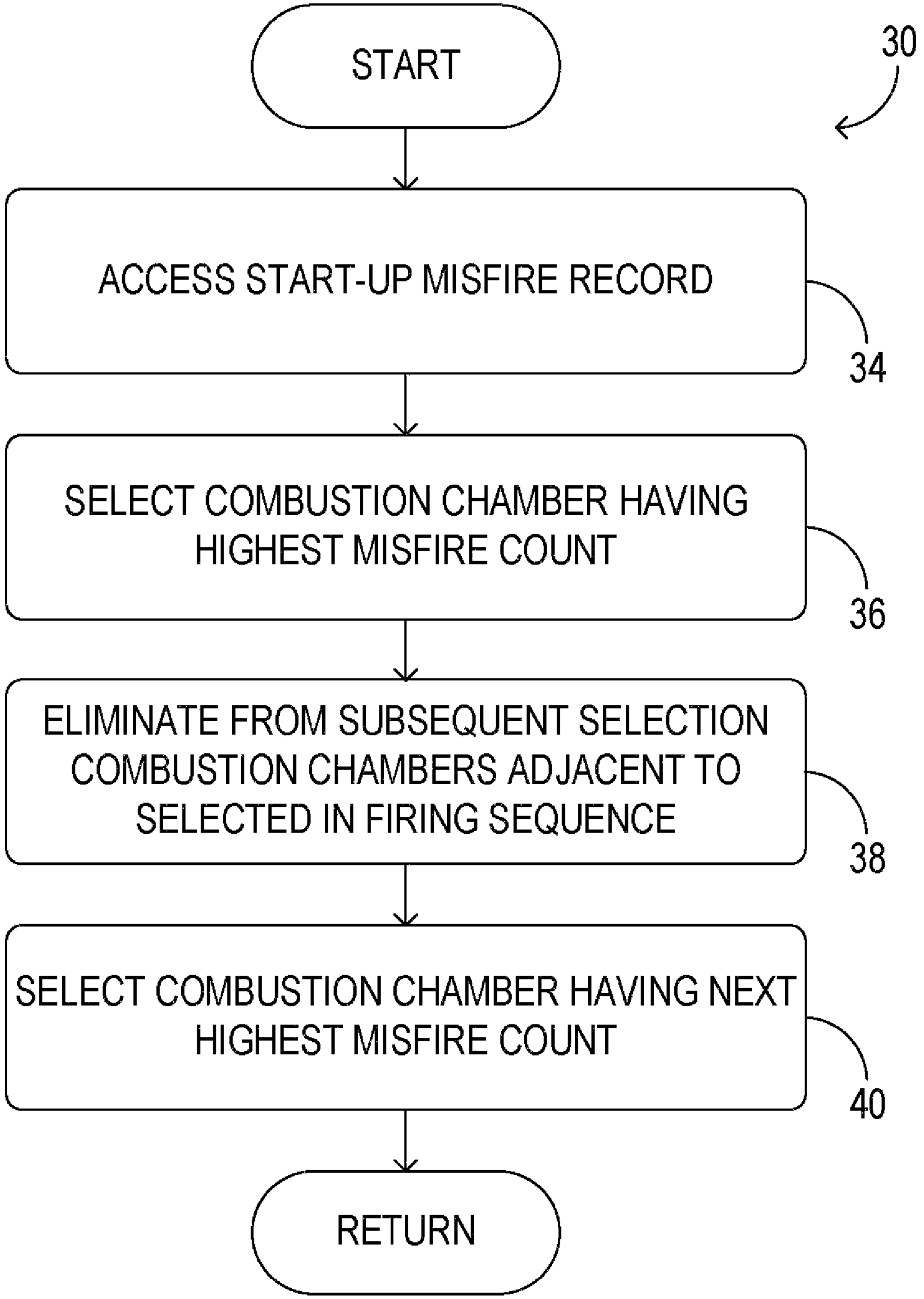
FIG. 4 shows a example method for omitting one or more fuel injections from a cold-start fueling sequence, in accordance with the present disclosure.

FIG. 4 illustrates an example method 30 for selecting one or more combustion chambers of the engine to omit from the fueling sequence at start-up. The method begins at 34, where a start-up misfire record of each of the engine’s combustion chambers is accessed by an electronic control unit of the motor vehicle. The start-up misfire record may be accumulated in advance of the start-up request and may be stored in a memory module (e.g., memory module 21 of FIG. 1) of the electronic control unit. The manner in which the start-up misfire record is compiled may depend on the engine configuration in which method 30 is enacted; one example is illustrated in FIG. 5 and described hereinafter.

Continuing in FIG. 4, method 30 advances to 36, where the combustion chamber having the highest start-up misfire count is selected for omission from the fueling sequence. The method then advances to 38, where combustion chambers adjacent in the fueling sequence to the one selected at 36 are removed from subsequent selection. Suppose, for example that the combustion chamber third in the fueling sequence has the highest start-up misfire count, and is omitted, at 36, from the fueling sequence. Step 38 ensures that the combustion chambers second and fourth in the fueling sequence are not also omitted, even if they also exhibit frequent misfires. Step 38 may be included in method 30 in embodiments where omitting two consecutive ignition events may adversely affect start-up performance. Or, step 38 may be left out in embodiments where omitting two consecutive ignition events is allowable.

Continuing in FIG. 4, method 30 advances to 40, where the combustion chamber having the next highest start-up misfire count (after elimination of two of the combustion chambers at 38, for example) is selected for omission from the fueling sequence. After 40, method 30 returns.

Figure 5:
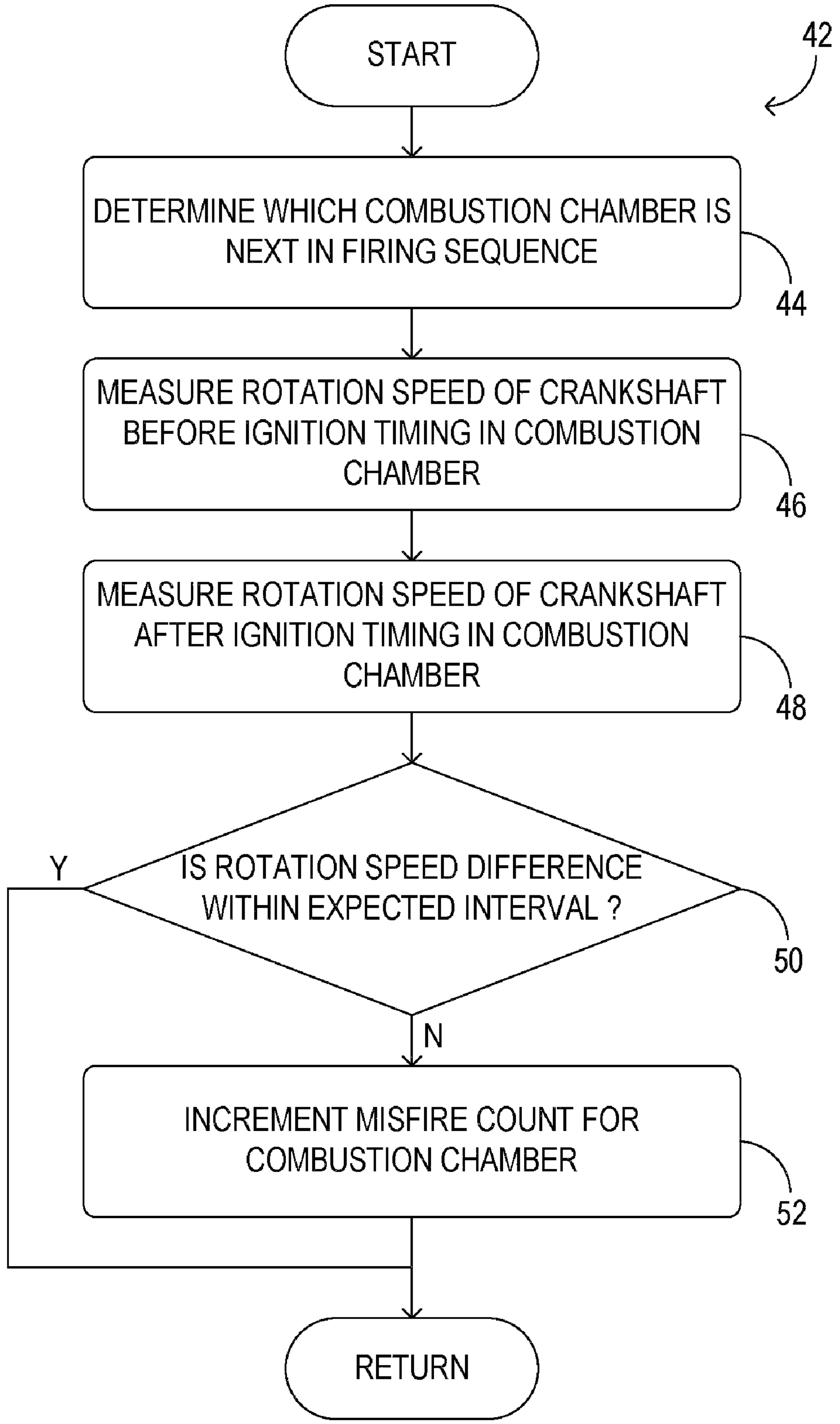
FIG. 5 shows an example method for indicating misfire of a combustion chamber of an engine, in accordance with the present disclosure.

FIG. 5 illustrates an example method 42 for accumulating a start-up misfire record in an electronic control unit of a motor vehicle. In one embodiment, the method may be executed during any attempted cold-start of the motor vehicle. In other embodiments, entry may be subject to one or more pre-conditions. Such pre-conditions may include: when a sufficiently volatile fuel is present in a fuel rail of the engine (inferred, e.g., via alcohol content or hesitant fuel detection), when the engine is sufficiently warm, when the crank speed is sufficient, when an operating voltage to the ignition system is above a threshold, as examples.

Method 42 begins at 44, where it is indicated which combustion chamber is next in the current fueling sequence. Such a determination can be made by accessing an electronic ignition control unit of the engine system, for example. The method then advances to 46, where the rotation speed of the crankshaft is measured during a first interval occurring prior to ignition timing in the indicated combustion chamber. The method then advances to 48, where the rotation speed of the crankshaft is measured during a second interval occurring after ignition timing in the indicated combustion chamber. The method then advances to 50, where it is determined whether the difference in rotation speeds measured in steps 46 and 48 are within an expected interval for a successful combustion and power stroke during start up. For example, successful combustion in the first fueled cylinder may increase engine speed from cranking speed (e.g., 200 revolutions/minute) to an engine running speed (e.g., 600 revolutions/minute) over the power stroke of the first fueled cylinder. If that speed increase, measured by the time stamping of crank angle position data, fails to exceed a threshold speed increase (e.g., 100 revolutions/minute), then ignition in the first fueled combustion chamber may be indicated failed.

If the difference in rotation speeds is determined to be outside of the expected interval, then the method advances to 52, where a misfire count for the indicated combustion chamber is incremented by one. A misfire count for each of the combustion chambers may be included in the start-up misfire record of the engine system, which may stored in a memory (e.g., memory module 21) of the engine system’s electronic control unit. In other embodiments, method 42 may be based on measuring acceleration, torque, time-to-position, and/or kinetic energy, as examples.

It is further contemplated that an excessive misfire count for any combustion chamber may signal a need for maintenance, as this condition may result from a fouled spark plug, a valve sealing issue, etc. Therefore, in some embodiments, a misfire count exceeding a predetermined threshold, or increasing faster than a predetermined rate, may be indicated in an on-board diagnostic system of the motor vehicle (by setting a flag or modifying a MIL code, for example).

Combination of the exemplary methods described above yield various composite methods for starting an engine of a motor vehicle, the engine having two or more fuel injectors directly coupled to two or more combustion chambers and a pump configured to provide fuel to the two or more fuel injectors. One such method comprises delivering fuel to the two or more combustion chambers via a first plurality of fuel injectors during a first starting condition of the engine, the first plurality of fuel injectors including a second, lesser, plurality of fuel injectors; and delivering fuel to the engine via the second plurality of fuel injectors during a second starting condition of the engine; wherein a throughput capacity of the pump is responsive to a speed of the engine and to a prior throughput of the pump integrated over a partial cycle of the engine, and is greater than an optimal rate of fuel delivery to the first plurality of fuel injectors during the first starting condition, but less than the optimal rate of fuel delivery to the first plurality of fuel injectors during the second starting condition. It is further provided that fuel may be injected according to a first fueling sequence during the first starting condition and according to a second fueling sequence during the second starting condition, wherein one or more fuel injections of the first fueling sequence are omitted from the second fueling sequence based on a frequency of start-up misfire in the two or more combustion chambers.

To avoid the various problems associated with cold-start overfueling, the foregoing methods fuel a reduced number of combustion chambers during cold start at low engine temperatures. A related solution, applicable under the same or similar conditions, is to reduce the intake-manifold air pressure, whereby a reduced amount of fuel is provided to maintain an approximately stoichiometric air-to-fuel ratio during the cold start. Such methods are described hereinafter. It is further contemplated that both approaches may be combined for still greater advantages in cold-start reliability and emissions control performance.

Figure 6:
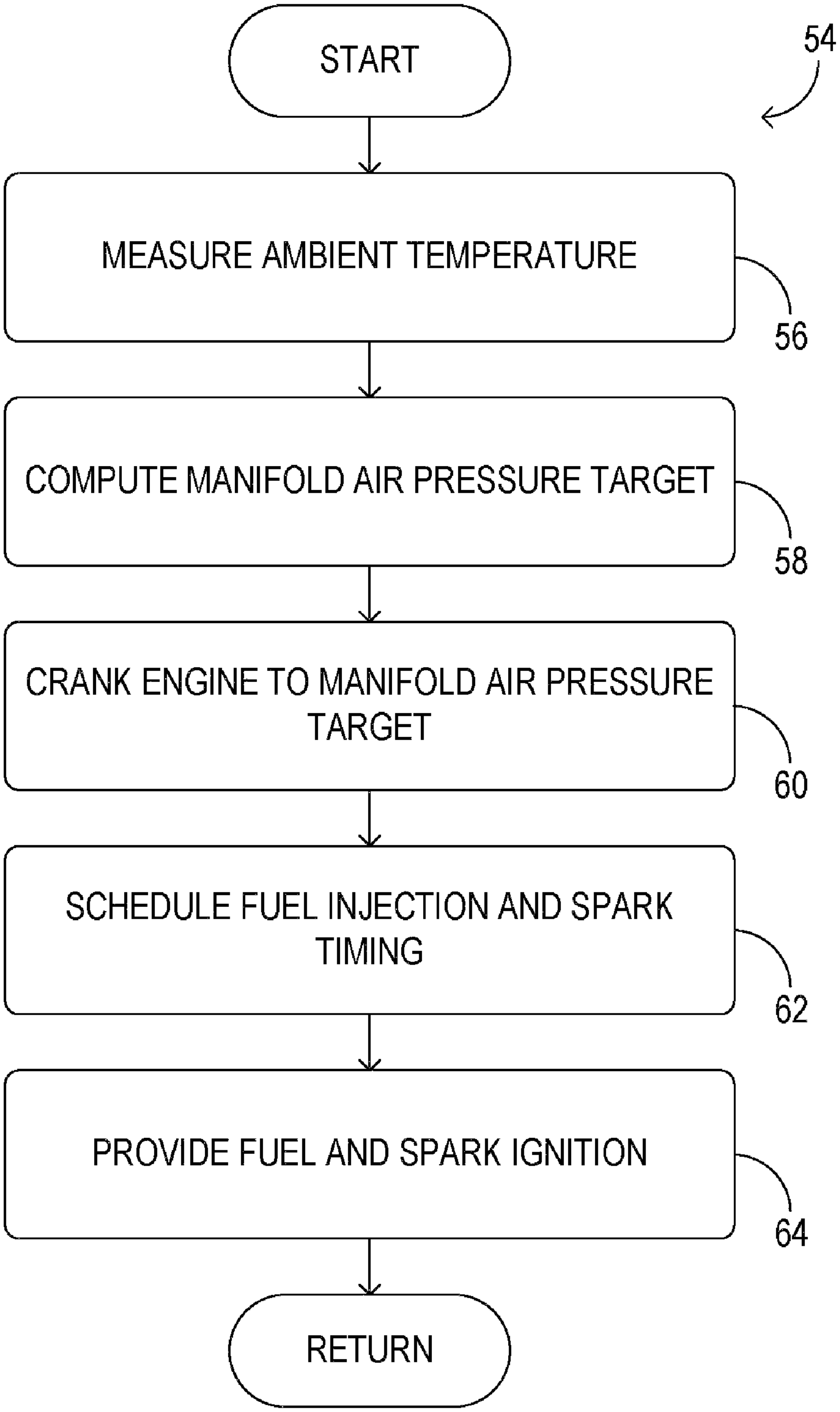
FIG. 6 shows another example method for starting an engine, in accordance with the present disclosure.

Thus, FIG. 6 illustrates an example method 54 for starting an engine of a motor vehicle, the engine having an intake manifold, an intake throttle controlling admission of air into the intake manifold, and a plurality of combustion chambers communicating with the intake manifold. The method comprises providing a reduced pressure of air in the intake manifold prior to delivering fuel or spark to the engine, the reduced pressure of air responsive to a temperature of the engine. The method further comprises delivering fuel to one or more of the plurality of combustion chambers in an amount based on the reduced pressure of air, and delivering spark to the one or more combustion chambers to start the engine. In one embodiment, the method may be invoked any time a cold start of the engine is requested, e.g., at the turning of an ignition key. In other embodiments, the method may be invoked when a cold start is requested, subject to one or more preconditions. For example, the method may be invoked when an ambient temperature, engine temperature, engine coolant temperature, or exhaust-aftertreatment catalyst temperature is below a threshold temperature. Though described presently with continued reference to aspects of FIG. 1, the example method may be enacted by various other configurations as well.

Method 54 begins at 56, where an engine temperature is measured. The engine temperature may be measured or estimated by an electronic control unit such as controller 15 via a sensor such as engine temperature sensor 19. For this purpose, however, virtually any motor-vehicle component responsive to engine temperature and operatively coupled to the controller may be used to measure the temperature.

Method 54 then advances to 58, where a target intake-manifold air pressure is computed in the electronic control unit. The target intake-manifold air pressure may be computed based on various parameters in order to optimize cold-start reliability and/or to minimize cold-start emissions. To compute the target intake-manifold air pressure, the electronic control unit may employ any appropriate digital and/or analog electronics—algorithms, look-up tables, analog computation, etc.

In one embodiment, the target intake-manifold air pressure may be computed based at least on the engine temperature and on the volatility of the fuel. For instance, during relatively warm cold starts using relatively volatile fuel, the target intake-manifold air pressure may be substantially the same as the barometric pressure. Under such conditions, the liquid fuel injected into the combustion chambers of the engine may be efficiently vaporized, such that relatively little overfueling is needed to provide reliable ignition and adequate starting torque. However, at lower engine temperatures and/or with a less volatile fuel, the target intake-manifold air pressure may be lower than the barometric pressure. Under such conditions, charging the combustion chambers of the engine with a lower pressure of air may serve a dual purpose: it may promote more effective vaporization of the fuel, and it may require a smaller injection of fuel to arrive at the desired (e.g., stoichiometric) air-to-fuel ratio. Thus, the electronic control unit may be configured to decrease the target intake-manifold air pressure as the fuel volatility decreases and/or as the engine temperature decreases. The combined effects of changing engine temperature and changing fuel volatility may be expressed conveniently in terms of the vapor pressure of the fuel at the engine temperature. Thus, the reduced pressure of air provided in the intake manifold may be responsive to a vapor pressure of the fuel at the temperature of the engine. For example, the target intake-manifold air pressure may be increased when the vapor pressure of the fuel at the temperature of the engine increases and decreased when the vapor pressure of the fuel at the temperature of the engine decreases. Further, the target intake-manifold air pressure may be increased as an alcohol content of the fuel decreases, and increased as an alcohol content of the fuel increases.

In one embodiment, the target intake-manifold air pressure may be computed relative to the barometric pressure. Such a computation may be based on a measured, estimated, or assumed barometric pressure at this step of method 54. This embodiment may be appropriate for engine-system configurations in which the evolving intake manifold air pressure (vide infra) is also monitored relative to the barometric pressure and is not corrected or compensated based on the barometric pressure. In another embodiment, the target intake-manifold air pressure may be computed as an absolute pressure. This embodiment may be appropriate for engine-system configurations in which the evolving intake-manifold air pressure is monitored as an absolute pressure or is corrected or compensated based on the measured barometric pressure.

Method 54 then advances to 60, where the engine is cranked to the target intake-manifold air pressure. In one embodiment, the electronic control unit may command an intake throttle (e.g. intake throttle 16) to close at least partly, and then command the starter motor to begin cranking the engine. While the starter motor is cranking the engine, the electronic control unit may monitor an output of a sensor (e.g. intake-manifold air-pressure sensor 20) responsive to the intake-manifold air pressure. As noted above, the sensor output may be responsive either to the absolute intake-manifold air pressure or to the intake-manifold air pressure relative to the barometric pressure. In one embodiment, a separate barometric-pressure sensor may be used to correct or compensate the intake-manifold air-pressure sensor such that an absolute pressure measurement may be obtained. In this manner, air and fuel amounts provided to the combustion chambers during the cold start may be substantially independent of altitude and barometric pressure, for increased reliability. Thus, the overall process of monitoring the evolving pressure of air in the intake manifold may comprise monitoring the evolving pressure of air relative to barometric pressure and correcting the evolving pressure of air by adding the barometric pressure thereto, wherein the target pressure is an absolute pressure.

When the electronic control unit determines that the intake-manifold air pressure is at or near the target intake-manifold air pressure, then the method advances to 62. In another embodiment, engine cranking may continue after the intake-manifold air pressure traverses the target intake-manifold air pressure, such that the intake-manifold air pressure becomes lower than the target intake-manifold air pressure. The electronic control unit may then command the intake throttle to open partly and remain open until the target intake-manifold air pressure is reached. In some embodiments, the degree of intake throttle closure and/or the degree of subsequent intake throttle opening in the variants of process step 60 may depend on the target intake-manifold air pressure. Thus, the intake throttle may be commanded to close more tightly or to open less widely as the target intake-manifold air pressure degreases. After 60, the method advances to 62.

In some embodiments, a duration of cranking the engine prior to delivering fuel or spark to the engine may be limited by various factors. One factor that may require such cranking to be limited or suspended is when an emissions-control catalyst disposed in an exhaust system of the motor vehicle is active. In one embodiment, method 54 may be limited to conditions of cold or inactive emissions-control catalysts.

Other embodiments fully consistent with this disclosure may provide the reduced pressure of air by some other procedure. For example, in addition to the main intake throttle, the intake-manifold air pressure can in part be controlled by the fuel vapor purge valve and a controllable crankcase ventilation valve. In still other embodiments, the intake manifold may be evacuated with the aid of a vacuum source external to the combustion chambers of the engine.

At 62, fuel injection and spark timing for the engine start are scheduled. Fuel-injection timing and spark-ignition timing may be adjusted based at least partly on the engine temperature determined at 56 and on the target intake-manifold air pressure. In particular, fuel injection rates or amounts may be computed so as to provide a substantially stoichiometric air/fuel charge to the one or more combustion chambers which are fueled during the cold start. Further, fuel injection and spark timing may be adjusted based on which, if any, combustion chambers are omitted from the fueling sequence. Thus, fuel may be delivered to fewer than the total number of combustion chambers disposed in the engine. In that event, one or more of the combustion chambers may be selected for fueling during the cold start based at least partly on a record of start-up misfire in the plurality of combustion chambers. An electronic control unit may determine which, if any, combustion chambers to omit from the fueling sequence based on any appropriate method, including the methods described hereinabove by way of example. The electronic control unit may further be configured to advance an intake valve closing for at least one of the combustion chambers fueled, and to retard an intake valve closing for at least one of the combustion chambers not fueled. In this manner, the unfueled combustion chambers may be used to their full advantage in rapidly reducing the pressure of the intake manifold, and, the air charge in the fueled combustion chambers may be further reduced below the level of the intake manifold.

Method 54 then advances to 64, where engine start is attempted by providing fuel and spark ignition to the one or more combustion chambers scheduled for fueling and ignition in step 62 of the method.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in a control system. It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. An engine method, comprising:
before engine starting, accumulating a cylinder start-up misfire record;
during engine starting:
  selecting fewer than all cylinders for omission from fueling based on the record;
  before delivering fuel or spark, reducing intake manifold air pressure to a reduced pressure responsive to engine temperature, including retarding intake valve closing for unfueled cylinders; and
  fueling the remaining cylinders in an amount based on the reduced pressure and advancing their intake valve closing.

2. The method of claim 1, wherein the reduced pressure is further responsive to a vapor pressure of the fuel at the engine temperature.

3. The method of claim 1, wherein reducing intake manifold air pressure to the reduced pressure and delivering the fuel comprise providing a substantially stoichiometric air/fuel charge to the fueled cylinders.

4. The method of claim 1, wherein omitting fuel to fewer than all of the cylinders is further based on a throughput capacity of a high pressure pump of the engine.

5. The method of claim 1, wherein reducing intake manifold air pressure to the reduced pressure comprises evacuating an intake manifold using a vacuum source external to the cylinders.

6. The method of claim 1, wherein reducing intake manifold air pressure to the reduced pressure further comprises at least partly throttling an air intake of the engine while the engine is cranking, wherein a degree of throttling is adjusted in response to a number of cylinders not fueled.

7. The method of claim 6, wherein the engine is disposed in a motor vehicle, and wherein a duration of cranking the engine prior to delivering the fuel or spark to the engine is reduced when an emissions-control catalyst disposed in an exhaust system of the motor vehicle is active.

8. The method of claim 6, further comprising monitoring the intake manifold air pressure as it evolves and delivering the fuel and spark when the evolving pressure of air traverses a target pressure.

9. The method of claim 8, further comprising increasing the target pressure when a vapor pressure of the fuel at the engine temperature increases and decreasing the target pressure when the vapor pressure of the fuel at the engine temperature decreases.

10. The method of claim 8, further comprising increasing the target pressure as a fuel alcohol content decreases, and decreasing the target pressure when the fuel alcohol content increases.

11. The method of claim 8, wherein at least partly throttling the air intake of the engine while the engine is cranking comprises cranking the engine with an intake throttle at least partly closed, and wherein cranking the engine with the intake throttle at least partly closed is continued until the evolving pressure of air is less than the target pressure, the method further comprising at least partly opening the intake throttle until the evolving pressure traverses the target pressure.

12. The method of claim 8, wherein monitoring the evolving pressure of air in the intake manifold comprises monitoring the evolving pressure of air relative to barometric pressure and correcting the evolving pressure of air by adding the barometric pressure thereto, and wherein the target pressure is an absolute pressure.

13. A method for starting an engine of a motor vehicle, comprising:

at least partly throttling an air intake of the engine while the engine is cranking;

monitoring an evolving pressure of air in an intake manifold of the engine;

selecting fewer than all of a plurality of cylinders communicating with the intake manifold for omission from fueling based at least partly on a record of start-up misfire in the cylinders accumulated in advance of an engine start-up request;

advancing intake valve closing for at least one of the fueled cylinders, and retarding intake valve closing for at least one of the unfueled cylinders;

after the evolving pressure of air has traversed a target pressure, delivering fuel to the fueled cylinders in an amount based on the target pressure, the target pressure responsive to a vapor pressure of the fuel at engine temperature; and delivering spark to the fueled cylinders to start the engine.

14. The method of claim 13, further comprising increasing the target pressure when the vapor pressure of the fuel at the engine temperature increases and decreasing the target pressure when the vapor pressure of the fuel at the engine temperature decreases.

15. The method of claim 13, wherein the method is performed during an initial fueled cycle of the engine, the initial fueled cycle comprising two rotations of a crankshaft of the engine during which at least some fuel is injected for a first time since the engine was brought from rest.

16. A method for an engine, comprising:

during an engine start:

prior to delivering fuel or spark to the engine, reducing intake manifold air pressure to a reduced pressure responsive to engine temperature; and omitting fuel to fewer than all of a plurality of cylinders based on a record of start-up misfire in the cylinders accumulated in advance of the engine start, while fueling the remaining cylinders in an amount based on the reduced pressure;

wherein omitting cylinders from fueling based on the record of start-up misfire in the cylinders accumulated in advance of the engine start comprises:

selecting a cylinder having a highest start-up misfire count for omission from fueling;

removing cylinders adjacent to the cylinder having the highest start-up misfire count from subsequent selection; and from among the remaining cylinders, selecting a cylinder having a next highest start-up misfire count for omission from fueling.

17. A method for starting an engine of a motor vehicle under varying temperature conditions, the engine having a plurality of combustion chambers and a pump for pressurizing fuel for delivery to the combustion chambers, the method comprising:

during a first, higher-temperature, starting condition, directly injecting fuel into all of the combustion chambers during at least an initial fueled cycle of the engine, and spark igniting the fuel to increase a rotation speed of the engine, the initial fueled cycle comprising two rotations of a crankshaft of the engine during which at least some fuel is injected for a first time since the engine was brought from rest; and during a second, lower-temperature, starting condition, directly injecting fuel into less than all of the combustion chambers during at least the initial fueled cycle of the engine, and spark igniting the fuel to increase the rotation speed of the engine, with fuel being injected according to a first fueling sequence during the first starting condition and according to a second fueling sequence during the second starting condition, and with one or more fuel injections of the first fueling sequence being omitted from the second fueling sequence based on a frequency of start-up misfire in the plurality of combustion chambers, where during the first starting condition, directly injecting fuel into all of the combustion chambers comprises:

at least partly throttling an air intake of the engine while the engine is cranking;

monitoring an evolving pressure of air in an intake manifold of the engine; and after the evolving pressure of air has traversed a target pressure, delivering fuel to one or more of the plurality of combustion chambers in an amount based on the target pressure, the target pressure responsive to a vapor pressure of the fuel at engine temperature.

* * * * *